No. 752,391. PATENTED FEB. 16, 1904.
C. FLEISCHMANN.
ELECTRIC MOTOR.
APPLICATION FILED JUNE 24, 1903.
NO MODEL. 2 SHEETS—SHEET 1.

WITNESSES: INVENTOR:
Ralph Lancaster. Christian Fleischmann,
Russell M. Everett BY
Charles H. Pell
ATTORNEY.

No. 752,391. PATENTED FEB. 16, 1904.
C. FLEISCHMANN.
ELECTRIC MOTOR.
APPLICATION FILED JUNE 24, 1903.
NO MODEL. 2 SHEETS—SHEET 2.

WITNESSES:
Ralph Lancaster.
Russell M. Everett.

INVENTOR:
Christian Fleischmann,
BY
Charles H. Pell
ATTORNEY.

No. 752,391.  Patented February 16, 1904.

UNITED STATES PATENT OFFICE.

CHRISTIAN FLEISCHMANN, OF BLOOMFIELD, NEW JERSEY.

ELECTRIC MOTOR.

SPECIFICATION forming part of Letters Patent No. 752,391, dated February 16, 1904.

Application filed June 24, 1903. Serial No. 162,895. (No model.)

*To all whom it may concern:*

Be it known that I, CHRISTIAN FLEISCHMANN, a citizen of the United States, residing at Bloomfield, in the county of Essex and State of New Jersey, have invented and produced a new and original Improvement in Electric Motors; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to provide a motor in which the field-magnets shall be movable instead of the brushes, to thus enable adjustment to be made by shifting the said field-magnets, to avoid the use of a rocker-arm as now in common use, to provide suitable means for rotating the said field-magnets, and to obtain other advantages and results, some of which may be hereinafter referred to in connection with the description of the working parts.

The invention consists in the improved electric motor and in the arrangements and combinations of parts of the same, all substantially as will be hereinafter set forth and finally embraced in the clauses of the claim.

Figures 1, 2:
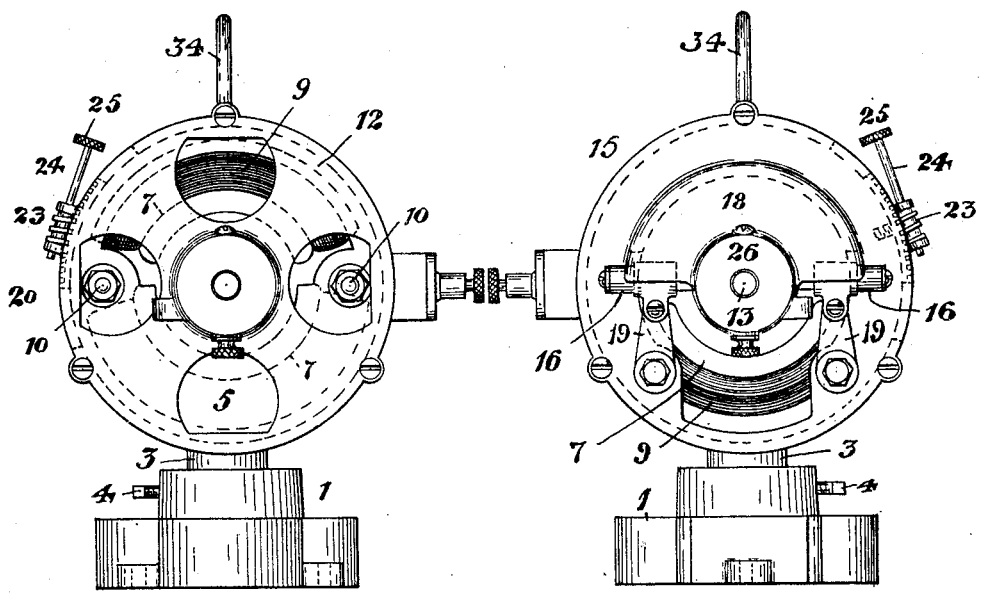
Figure 3:
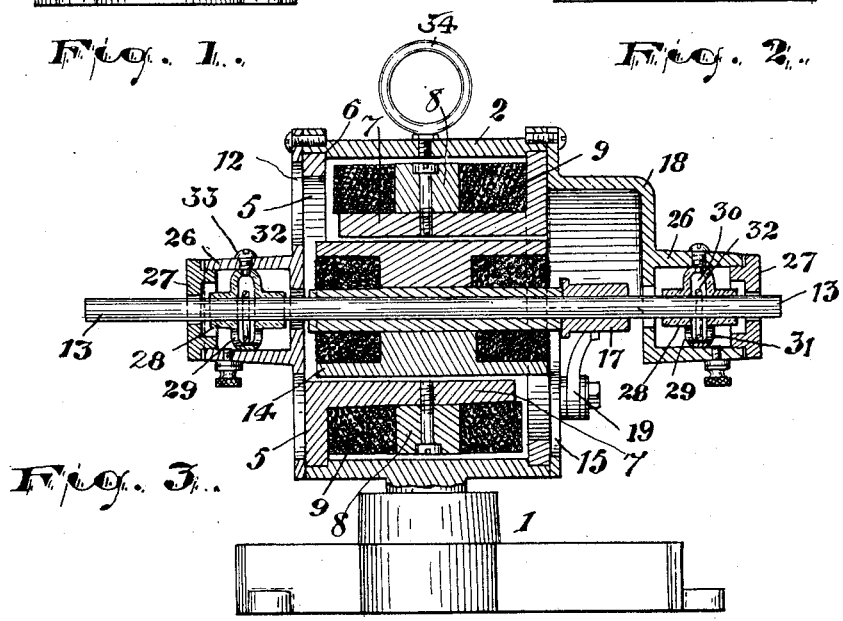
Figure 6:
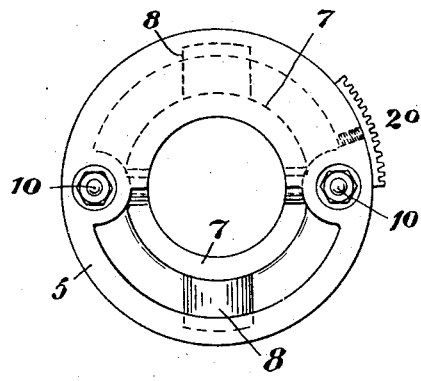
Figure 5:
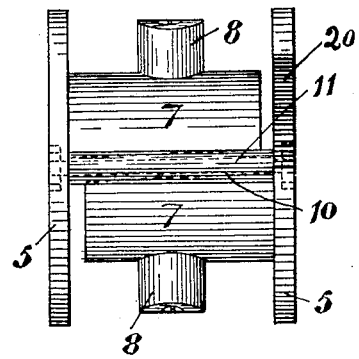
Figure 4:
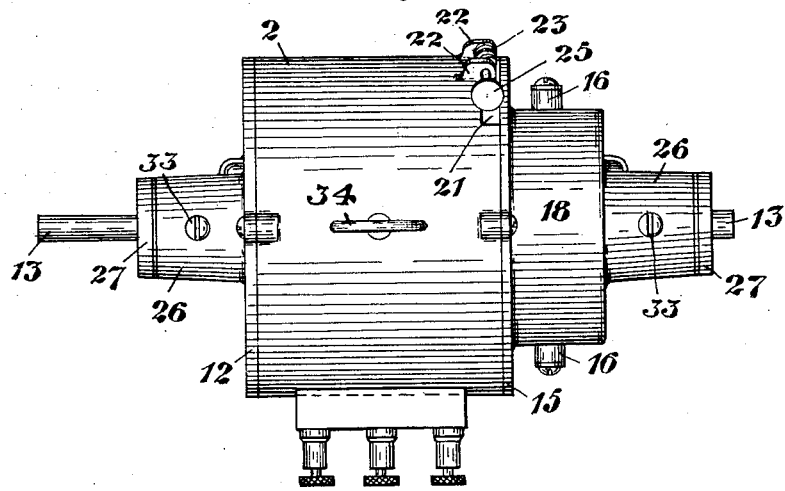

Referring to the accompanying drawings, in which like numerals of reference indicate corresponding parts in each of the several figures, Figures 1 and 2 are opposite end views of my improved motor. Fig. 3 is a vertical central longitudinal section of the motor. Fig. 4 is a plan of the motor. Fig. 5 is a view of the poles for the field-magnets detached, and Fig. 6 is an end view of the same.

In said drawings, 1 indicates a suitable base or pedestal upon which my improved motor is shown mounted, although it will be understood that the motor can be mounted in any suitable manner well known to the art. The motor proper comprises a cylindrical casing 2, open at both ends and having at its lower side a stem 3, adapted to enter the said pedestal 1 and be secured by a set-screw 4. Into each of the opposite ends of the said casing 2 is inserted an annular frame 5, which preferably lies at its edges in an interior groove or guideway 6 of the casing 2. Each of said frames 5 carries a semicylindric projection 7, both of which projections are adapted to lie within the cylindrical casing 2 with their convex or curved surfaces oppositely apart, and from said opposite convex surfaces at the middles of the projections 7 extend studs 8 8, diametrically opposite and adapted to receive the windings of the field-coils 9, which are common in motors. The said projection 7 and studs 8 thus form the poles of the field-magnets, as will be understood by one skilled in the art. The two frames 5 5 are preferably connected rigidly by means of bolts 10, having upon themselves tubular braces 11 to hold the frames at the proper distance apart. After the said frames 5 5, with the field-coil thereon, as described, have been inserted within the cylindrical casing 2 end plates are applied to the opposite ends of said casing, one of which, as 12, is a simple flat plate apertured to permit inspection of the interior devices and provided at its center with suitable journal-bearings for the shaft 13 of the armature. Said armature 14, mounted upon the shaft 13 in any usual manner, lies within the semicylindric field-coil carriers 7 7 and may be of any ordinary construction common to the art.

At the opposite end of the casing 2 is an end plate 15, upon the lower portion of which are brackets 19, supporting brushes 16, adapted to engage a commutator 17 upon the shaft 13 in any manner common to the art, except that instead of said brushes being movable, as usual, they are fixed in position. An upper portion of the end plate 15 upon said brush end of the motor projects outwardly, as at 18, to form a casing to inclose the commutator and brushes and supports at its lower part journal-bearings in alinement with those at the other end of the motor for the said shaft 13.

In adjusting my motor the field-coils 9 9 are shifted by rotating their carriers 5 5 within the casing 2 of the motor, the said frames 5 turning within their guideways 6 in said casings. To effect such oscillation of the field-carriers in a regular manner and determinate amount, an edge portion of one of the frames 5 is provided with rack-teeth 20, exposed by a slot 21 in the casing 2. Upon the said casing 2, adjacent to its slot 21, are brackets 22 22, on which is journaled a worm 23, lying longitudinally of said slot and adapted to engage the rack-teeth of the coil-carrier. Said worm has at one end of its shaft 24 a milled finger-piece 25 for turning, and thus it will be seen that the field-coil will be shifted very gradually and uniformly upon the turning of said worm. Furthermore, the worm will not permit an inadvertent displacement of the field-coil carriers and provides sufficient power to move the same under all conditions.

The journal-bearings for the shaft 13 may be of any desired construction; but I prefer to use those shown in the drawings and which comprise each an annular flange 26, projecting from the end plate of the motor and furnishing a tubular box, in which the shaft lies centrally and longitudinally. The end of said box is closed as by a cap 27, and within the box is a sleeve 28, fitting the shaft 13 and having at the middle an annular peripherally-projecting extension 29, which is hollow, as at 30, and opens directly into the shaft-passage of the sleeve 28.

At an upper point of the annular extension 29 the same receives a screw 33, projecting through the box 26 to prevent rotation of the sleeve. At a lower point the said annular extension is transversely perforated, as at 31, to admit oil, and within said annular extension is a ring 32, hung over the shaft 13 and adapted to convey oil to the same.

A ring 34 is provided at the top of the casing 2 for handling or lifting the motor, as is common in this class of machinery.

Having thus described the invention, what I claim as new is—

1. In an electric motor, a field-coil carrier comprising annular end frames having a cylindric portion of smaller diameter extending between with radial studs thereon to receive coils, and means for turning said carrier.

2. In an electric motor, a field-coil carrier composed of duplicate members each comprising an annular end frame having at one side a semicylindric projection with a radial stud thereon, clamping-bolts holding said members rigidly together, and means for rotating said carrier.

3. The combination of a casing providing interior annular ways and being slotted through the bottom of one of said ways, of a rotary field-coil carrier having opposite annular end frames adapted to be seated in said ways, and means for engaging one of said end frames through said slot to turn the carrier.

4. The combination of the cylindrical casing 2, an armature centrally mounted in said casing, a commutator at one end of said armature, stationary brushes engaging said commutator, a cylindrical field-coil carrier inclosing the armature and being mounted at its ends upon frames rotatable in said casing, one of said frames providing at its edge rack-teeth, and a worm mounted upon the exterior of the casing in engagement with said rack-teeth.

In testimony that I claim the foregoing I have hereunto set my hand this 20th day of June, 1903.

CHRISTIAN FLEISCHMANN.

Witnesses:
   CHARLES H. PELL,
   RUSSELL M. EVERETT.